(12) United States Patent
Klomsdorf et al.

(10) Patent No.: US 11,758,033 B2
(45) Date of Patent: Sep. 12, 2023

(54) COMMUNICATION PROTOCOL BASED ON PHYSICAL CONFIGURATION OF A WIRELESS DEVICE

(71) Applicant: Motorola Mobility LLC, Chicago, IL (US)

(72) Inventors: Armin W. Klomsdorf, Chicago, IL (US); Mohammed Rajeek Abdul-Gaffoor, Palatine, IL (US); John Peter Vitale, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/864,183

(22) Filed: Jul. 13, 2022

(65) Prior Publication Data

US 2022/0353356 A1 Nov. 3, 2022

Related U.S. Application Data

(62) Division of application No. 17/116,931, filed on Dec. 9, 2020, now Pat. No. 11,632,449.

(51) Int. Cl.
*H04M 1/02* (2006.01)
*H01Q 1/08* (2006.01)
*H01Q 1/24* (2006.01)
*H04W 88/06* (2009.01)

(52) U.S. Cl.
CPC ............ *H04M 1/0245* (2013.01); *H01Q 1/08* (2013.01); *H01Q 1/243* (2013.01); *H04W 88/06* (2013.01)

(58) Field of Classification Search
CPC ....... H04M 1/0245; H01Q 1/243; H01Q 1/08; H04W 88/06
See application file for complete search history.

(56) References Cited

U.S. PATENT DOCUMENTS

| | | | | |
|---|---|---|---|---|
| 6,681,125 | B1* | 1/2004 | Woo | H01Q 1/245 455/556.1 |
| 7,395,089 | B1* | 7/2008 | Hawkins | H04M 19/047 455/556.1 |
| 11,632,449 | B2 | 4/2023 | Klomsdorf et al. | |
| 2003/0137459 | A1* | 7/2003 | Kim | H01Q 1/244 343/702 |

(Continued)

OTHER PUBLICATIONS

U.S. Appl. No. 17/116,931, "Notice of Allowance", U.S. Appl. No. 17/116,931, dated Feb. 7, 2023, 5 pages.

(Continued)

*Primary Examiner* — Lewis G West
(74) *Attorney, Agent, or Firm* — FIG. 1 Patents

(57) ABSTRACT

Techniques for communication protocol based on physical configuration of a wireless device are described and may be implemented to adapt to a variety of different wireless scenarios. For instance, configuration of an antenna system of a wireless device is adapted to optimize wireless performance in different physical configurations, such as open configurations and folded configurations. Further, network communications are adapted to optimize wireless communication with a wireless device in different physical configurations of the wireless device. The described techniques, for instance, optimize performance in different frequency bands based on changes in device configuration between open positions and folded positions.

20 Claims, 10 Drawing Sheets

(56) References Cited

U.S. PATENT DOCUMENTS

| | | | | |
|---|---|---|---|---|
| 2004/0058721 A1* | 3/2004 | Kanazawa | ............ | H01Q 1/244 |
| | | | | 455/90.3 |
| 2004/0185920 A1* | 9/2004 | Choi | ................. | H04M 1/0245 |
| | | | | 455/575.1 |
| 2005/0128155 A1* | 6/2005 | Fukuda | ................ | H01Q 1/242 |
| | | | | 343/750 |
| 2006/0071863 A1* | 4/2006 | Lindell | ................ | H01Q 1/243 |
| | | | | 343/702 |
| 2006/0105801 A1* | 5/2006 | Cho | ...................... | H04N 7/147 |
| | | | | 348/E7.081 |
| 2006/0135226 A1* | 6/2006 | Won | ................... | H04M 1/0245 |
| | | | | 455/575.3 |
| 2007/0164913 A1* | 7/2007 | Sakamoto | ............ | H01Q 1/243 |
| | | | | 343/702 |
| 2007/0194997 A1* | 8/2007 | Nakanishi | ............ | H01Q 1/243 |
| | | | | 343/702 |
| 2007/0203065 A1* | 8/2007 | Vukicevic | ........... | G01N 33/507 |
| | | | | 514/7.3 |
| 2008/0143609 A1* | 6/2008 | Mashima | ............. | H01Q 21/29 |
| | | | | 343/702 |
| 2008/0225181 A1* | 9/2008 | Kamada | ............. | H04M 1/0245 |
| | | | | 375/E7.076 |
| 2009/0270139 A1* | 10/2009 | Okajima | ............... | H01Q 1/243 |
| | | | | 343/702 |
| 2010/0184458 A1* | 7/2010 | Fodor | ............... | H04W 52/0216 |
| | | | | 455/574 |
| 2010/0245186 A1* | 9/2010 | Kojima | ................. | H01Q 21/28 |
| | | | | 343/702 |
| 2010/0273420 A1* | 10/2010 | Mabuchi | ............... | H04W 76/18 |
| | | | | 455/41.2 |
| 2014/0240178 A1* | 8/2014 | Chun | .................... | H01Q 1/243 |
| | | | | 343/702 |
| 2014/0361932 A1* | 12/2014 | Irci | ..................... | H01Q 1/2266 |
| | | | | 343/702 |
| 2016/0187994 A1* | 6/2016 | La | .......................... | G06F 3/147 |
| | | | | 345/619 |
| 2019/0132794 A1* | 5/2019 | Geng | ................... | H04W 76/27 |
| 2019/0326667 A1* | 10/2019 | Xiang | ................... | H01Q 1/243 |
| 2020/0333855 A1* | 10/2020 | Kim | ..................... | G06F 1/1681 |
| 2020/0344336 A1* | 10/2020 | Li | ....................... | H04M 1/0268 |
| 2021/0329481 A1* | 10/2021 | Xue | ..................... | H04L 5/0053 |
| 2022/0182473 A1 | 6/2022 | Klomsdorf et al. | | |

OTHER PUBLICATIONS

U.S. Appl. No. 17/116,931, "Supplemental Notice of Allowability", U.S. Appl. No. 17/116,931, dated Mar. 23, 2023, 3 pages.

U.S. Appl. No. 17/116,931, "Non-Final Office Action", U.S. Appl. No. 17/116,931, dated Jul. 26, 2022, 10 pages.

U.S. Appl. No. 17/116,931, "Restriction Requirement", U.S. Appl. No. 17/116,931, dated May 11, 2022, 6 pages.

* cited by examiner

COMMUNICATION PROTOCOL BASED ON PHYSICAL CONFIGURATION OF A WIRELESS DEVICE

RELATED APPLICATION

This application is a divisional of and claims priority to U.S. patent application Ser. No. 17/116,931 titled "Antenna Configuration for a Foldable Device" and filed 9 Dec. 2020, the entire contents of which are hereby incorporated by reference herein in their entirety.

BACKGROUND

Wireless communication is ubiquitous and is used for a multitude of purposes, including wireless voice and data communication. Further, wireless devices are constantly evolving not only in terms of the availability of advanced wireless protocols but also in availability of different form factors. One particularly useful form factor is the folding device that can assume different orientations, such as an open configuration with expanded user interaction capabilities and a folded configuration that allows for increased portability. Challenges arise, however, in positioning antennas on a folding device. For instance, most modem wireless devices include multiple antennas to enable support for different wireless protocols on a single device. In a folding device, this can result in an obstructed antenna and/or interference between antennas and thus reduced wireless performance in a folded orientation due to the limited space for antenna placement.

BRIEF DESCRIPTION OF THE DRAWINGS

Aspects of communication protocol based on physical configuration of a wireless device are described with reference to the following Figures. The same numbers may be used throughout to reference similar features and components that are shown in the Figures.

DETAILED DESCRIPTION

Figure 1:
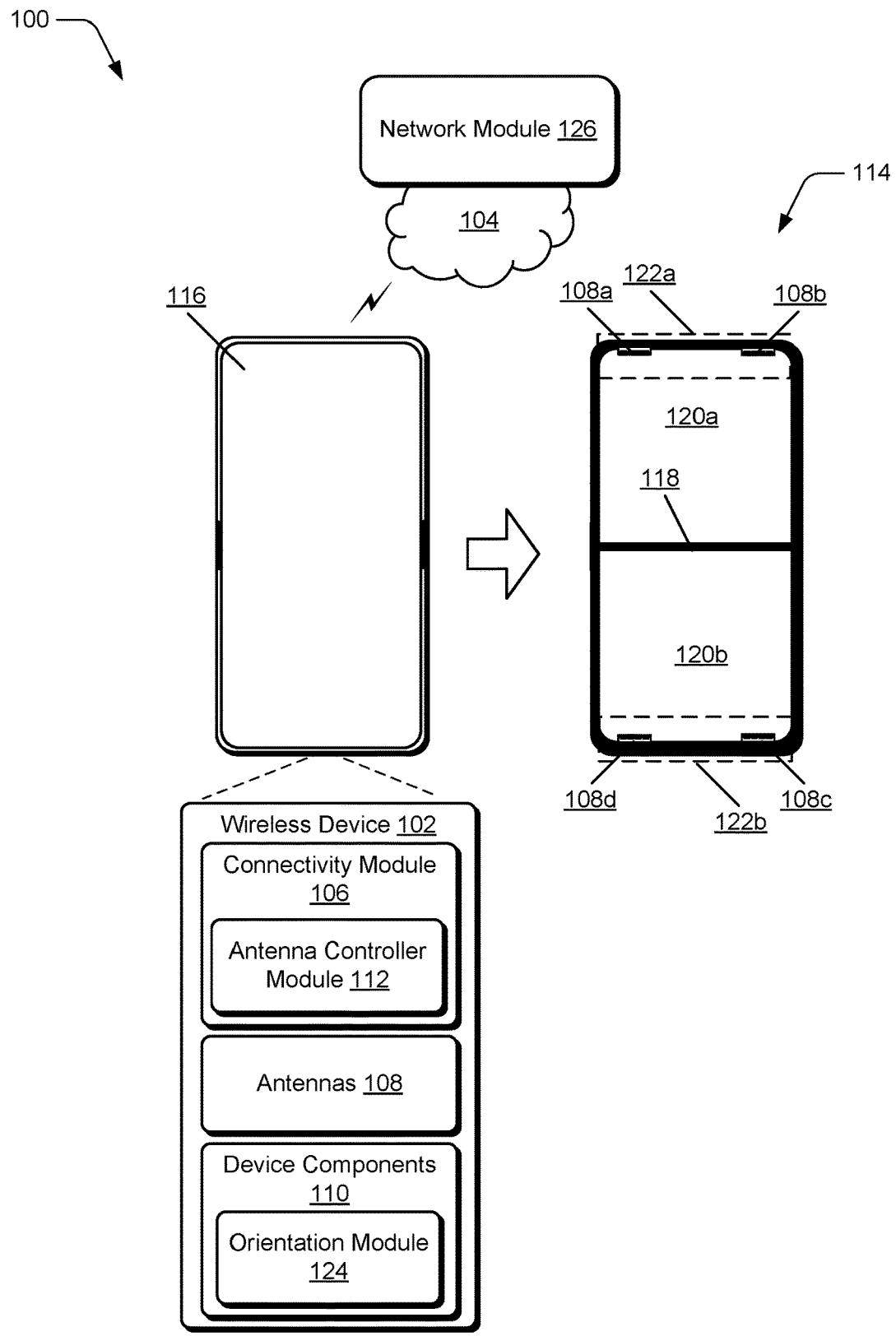
FIG. 1 illustrates an example environment in which aspects of communication protocol based on physical configuration of a wireless device can be implemented.

Techniques for communication protocol based on physical configuration of a wireless device are described and may be implemented via a wireless device to adapt to a variety of different wireless scenarios. For instance, configuration of an antenna system of a wireless device is adapted to optimize wireless performance in different physical configurations, such as open configurations and folded configurations. Generally, the described techniques utilize multi-antenna systems configured to utilize various frequency bands, such as such as long term evolution (LTE) and 5G new radio (NR) frequencies as part of the E-UTRAN New Radio-Dual Connectivity (EN-DC) protocols. Further, the described techniques optimize performance in different frequency bands based on changes in device configuration between open positions and folded positions.

For instance, consider an example wireless device that includes two chassis members that are foldable about a hinge assembly to assume different physical configurations. Further, each chassis member includes a separate set of antennas that are usable to transmit and receive wireless signal. Accordingly, implementations described herein enable the individual antennas to be separately controlled to accommodate changes in physical orientation of the chassis members relative to one another. For instance, consider a scenario wherein the wireless device is in an open position such that the chassis members are pivoted to an open position relative to each other. The chassis members, for instance, are coplanar. In the open position, the individual antennas in each chassis member are utilized in an open mode to handle particular transmit and receive tasks, such as primary receive, diversity receive, multiple-input and multiple-output (MIMO), antenna switch diversity (ASDiv), and so forth.

Consider further that the wireless device is transitioned to a folded physical orientation, such as by pivoting one of the chassis members about the hinge assembly. In the folded position, for example, the chassis members are positioned laterally adjacent one another. In the folded position, the antennas in the chassis members are positioned more closely to each other than in the open position. Generally, the proximity of the antennas in the folded position may result in coupling and/or interference between wireless signals transmitted and received at the different antennas and/or some antennas being obstructed. Accordingly, the antennas are reconfigured into a folded mode of operation to optimize device performance. In one example, the folded mode includes reducing functionality of a first set of antennas in one of the chassis members. The first set of antennas, for instance, are turned off and/or removed from an active antenna path utilized by the wireless device. Further, the folded mode causes wireless functionality of a second set of antennas in the other chassis member to be reconfigured. For instance, the folded mode represents a reduced wireless functionality set in comparison with the open mode.

Generally, utilizing an antenna system that is reconfigurable based on device physical configuration provides multiple advantages over current foldable device implementations, such as providing for increased antenna path options that are adaptable based on device physical configuration. This enables wireless performance of a wireless device to by optimized for different antenna positions. Further, device resources such as battery charge are conserved by reducing antenna functionality for antennas that are likely to experience significant interference in particular physical configurations and thus are unlikely to provide sufficient wireless response to justify powering the antennas.

While features and concepts of communication protocol based on physical configuration of a wireless device can be implemented in any number of different devices, systems, environments, and/or configurations, aspects of communication protocol based on physical configuration of a wireless device are described in the context of the following example devices, systems, and methods. Further, examples are discussed herein in the context of a wireless device with a single hinge and two foldable members. This is not to be construed as limiting, however, and the described techniques are employable to adapt antenna configurations in wireless devices with any number of hinges and/or foldable members.

FIG. 1 illustrates an example environment 100 in which aspects of communication protocol based on physical configuration of a wireless device can be implemented. The example environment 100 includes a wireless computing device ("wireless device") 102 that is connectable to wireless network 104. In this particular example, the wireless device 102 represents a portable device that can be carried by a user, such as a smartphone, a tablet device, a laptop, a wearable computing device, (e.g., a smartwatch or a fitness tracker), and so forth. These examples are not to be construed as limiting, however, and the wireless device 102 can be implemented in a variety of different ways and form factors. Further example attributes of the wireless device 102 are discussed below with reference to the device 1000 of FIG. 10.

The wireless device 102 includes various functionality that enables the wireless device 102 to perform different aspects of communication protocol based on physical configuration of a wireless device discussed herein, including a connectivity module 106, antennas 108, and device components 110. The connectivity module 106 represents functionality (e.g., hardware and logic) that enables the wireless device 102 to communicate wirelessly, such as for wireless data and voice communication. The connectivity module 106, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The connectivity module 106 includes an antenna controller module 112 which represents functionality for adapting operating parameters of the antennas 108. The antenna controller module 112 and the antennas 108, for example, cooperatively enable the wireless device 102 to send and receive wireless signal, such as for wireless connectivity to the wireless network 104. The individual antennas 108, for instance, represent different physical antenna devices that are operable to receive wireless signal transmitted over the wireless network 104, and to transmit wireless signal over the wireless network 104. Generally, the wireless device 102 may employ instances of the antennas 108 physically arranged at different locations on the wireless device 102, such as to optimize wireless performance of the wireless device 102. The device components 110 represent different structural and functional components of the wireless device 102, such as a device chassis, a printed circuit board (PCB) and various electronic components such as wireless communication components, a camera, a battery, input/output components, and so forth.

The environment 100 depicts an internal view 114 that represents a view of the wireless device 102 with a surface removed, such as via removal of a display screen 116 of the wireless device 102. Depicted in the internal view 114 is an antenna 108a, antenna 108b, antenna 108c, and antenna 108d, which represent different instances of the antennas 108. As shown, the antennas 108 are each positioned at different physical locations on the wireless device 102. Further, the antennas 108 are interconnected to provide an integrated antenna structure for enabling the wireless device to send and receive wireless signal. This particular arrangement of antennas 108 is presented for purpose of example only, and it is to be appreciated that the described implementations can utilize a variety of different arrangements of antennas not expressly described herein.

The internal view 114 also illustrates a hinge assembly 118 that enables the wireless device 102 to fold about the hinge assembly 118 to assume different orientations. For instance, the wireless device 102 includes a first member 120a and a second member 120b that are foldably attached via the hinge assembly 118. The first member 120a and the second member 120b, for instance, represent different portions of a chassis of the wireless device 102 that are pivotable about the hinge assembly 118 to enable the wireless device 102 to assume different physical and mechanical orientations. Further, the first member 120a includes a first antenna region 122a that represents a region where the antennas 108a, 108b are positioned, and the second member 120b includes a second antenna region 122b wherein the antennas 108c, 108d are positioned. As further detailed below, in a folded orientation, the antennas 108a, 108b are positioned adjacent the antennas 108c, 108d and thus the antenna controller module 112 is configured to adjust operational parameters of the antennas 108 to account for changes in antenna performance that result from changes in device orientation.

The device components 110 include an orientation module 124 which represents functionality for tracking orientation state of the wireless device 102, such as orientation of the first member 120a relative to the second member 120b, rotational orientation of the hinge assembly 118, and so forth. Thus, the orientation module 124 is able to inform the antenna controller module 112 regarding orientation of the wireless device 102. For instance, the orientation module 124 includes an orientation sensor that detects changes in device orientation, such as in response to a user pivoting the first member 120a and/or the second member 120b about the hinge assembly 118. The orientation module 124 communicates orientation information to the antenna controller module 112, which enables the antenna controller module 112 to adapt operation of the antennas 108 to optimize wireless performance of the wireless device 102.

The network 104 includes a network module 126 which represents functionality for configuring and controlling operation of the network 104. The network module 126, for instance, controls network settings for controlling wireless signal transmission to the wireless device 102. Generally, the network module 126 represents hardware and logic for managing operation of the network 104 and can include various network entities such as a network controller, network elements of a wireless cellular network, (Evolved Node B (eNodeB)) for a 4G LTE wireless network, gNodeB (gNB) for a 5G New Radio (NR) wireless network, and so forth. In at least one implementation, changes in the physical configuration of the wireless device 102 that occur based on pivoting of the first member 120*a* and/or the second member 120*b* about the hinge assembly 118 are communicated to the network module 126 to enable the network module 126 to adapt settings of the network 104 to optimize wireless performance of the wireless device 102.

Figure 2A:
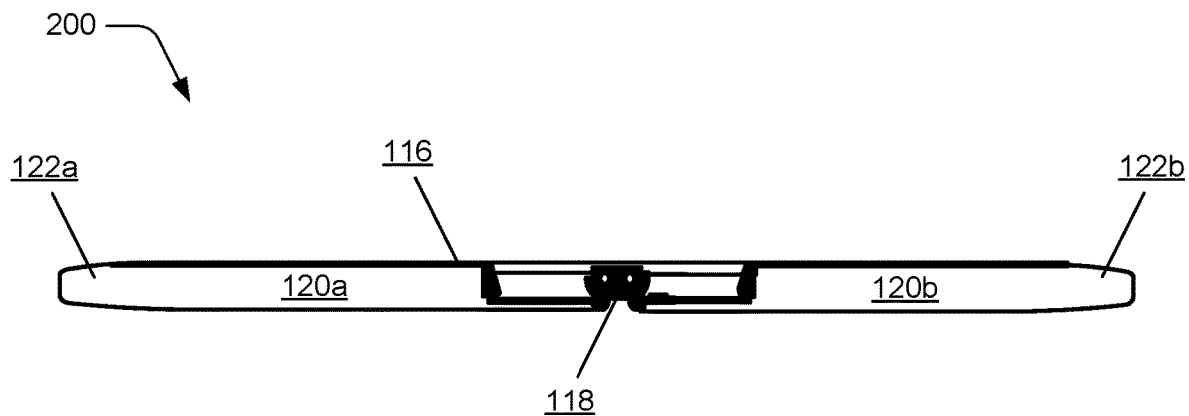
FIG. 2a depicts an example implementation of a wireless device in an open configuration in accordance with one or more implementations.
Figure 2B:
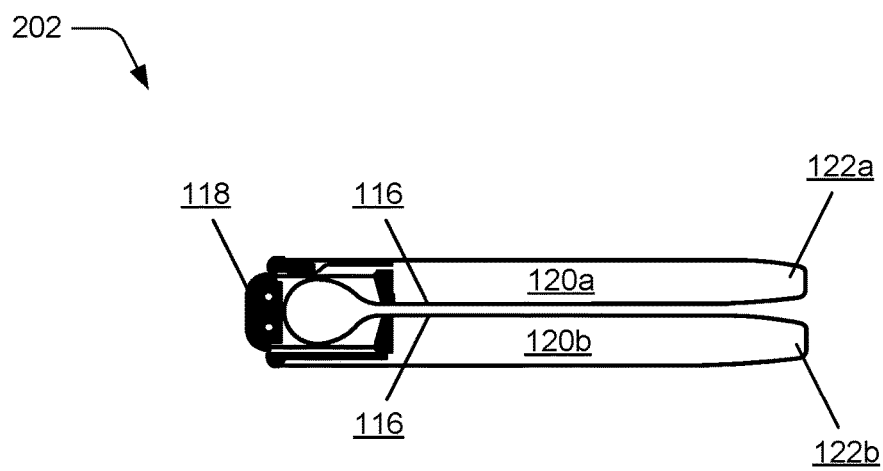
FIG. 2b depicts an example implementation of a wireless device in a folded configuration in accordance with one or more implementations.

FIGS. 2*a* and 2*b* depict implementations of the wireless device 102 in the context of a folding device in an open and folded orientation. For instance, FIG. 2*a* depicts the wireless device 102 in an open configuration 200 including the display screen 116, the first member 120*a*, and the second member 120*b* in a planar orientation. Further depicted is the hinge assembly 118 about which the first member 120*a* and the second member 120*b* are foldable to assume a folded (e.g., closed) position. The first member 120*a* includes the first antenna region 122*a* where the antennas 108*a*, 108*b* are positioned and the second member 120*b* includes the second antenna region 122*b* where the antennas 108*c*, 108*d* are positioned.

FIG. 2*b* depicts the wireless device 102 folded about the hinge assembly 118 to assume a folded configuration 202. In the folded configuration, the first member 120*a* is positioned adjacent (e.g., in contact with) the second member 120*b* such that the antenna region 122*a* is adjacent (e.g., in contact with) the antenna region 122*b*. In at least one implementation, placing the wireless device 102 into the folded configuration 202 causes the antenna controller module 112 to adapt operating parameters of the antennas 108, such as detailed below.

Figure 3:
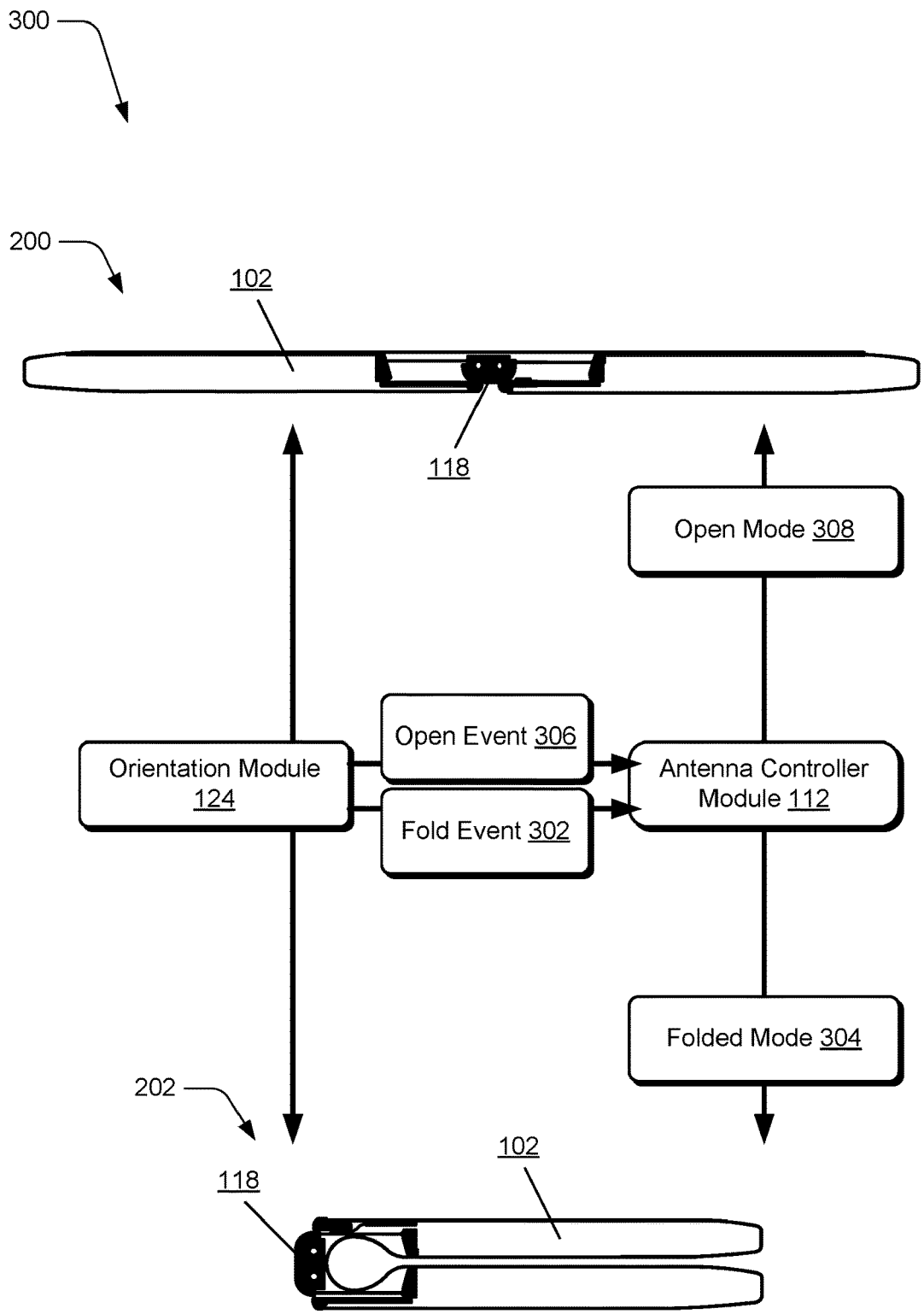
FIG. 3 depicts an example implementation scenario for adapting antenna operating parameters based on physical configuration of a wireless device in accordance with one or more implementations.

FIG. 3 depicts an example implementation scenario 300 for adapting antenna operating parameters based on physical configuration of the wireless device 102. In the scenario 300, the wireless device 102 switches between the open configuration 200 and the folded configuration 202. For instance, in response to transitioning from the open configuration 200 to the folded configuration 202, the orientation module 124 detects this change in orientation of the wireless device 102 and generates a folded orientation event ("fold event") 302 and communicates the fold event 302 to the antenna controller module 112. The fold event 302, for example, includes data indicating that the wireless device 102 transitions to the folded configuration 202. Accordingly, the antenna controller module 112 applies a folded orientation mode ("folded mode") 304 to the antennas 108. As further detailed below, applying the folded mode 304 includes adapting operating parameters of the antennas 108. For instance, applying the folded mode 304 includes limiting (e.g., disabling) operation of the antennas 108*a*, 108*b*, and adapting wireless signal activity of the antennas 108*c*, 108*d* to compensate for decreased activity of the antennas 108*a*, 108*b*.

Further to the scenario 300, in response to transitioning from the folded configuration 202 to the open configuration 200, the orientation module 124 detects this change in orientation of the wireless device 102 and generates an open orientation event ("open event") 306 and communicates the open event 306 to the antenna controller module 112. The open event 306, for example, includes data indicating that the wireless device 102 transitions to the open configuration 200. Accordingly, the antenna controller module 112 applies an open orientation mode ("open mode") 308 to the antennas 108. As further detailed below, applying the open mode 308 includes adapting operating parameters of the antennas 108. For instance, applying the open mode 308 includes enabling wireless signal activity of the antennas 108*a*, 108*b*, and adapting wireless signal activity of the antennas 108*c*, 108*d* to adapt to the change in activity of the antennas 108*a*, 108*b*.

Figure 4:
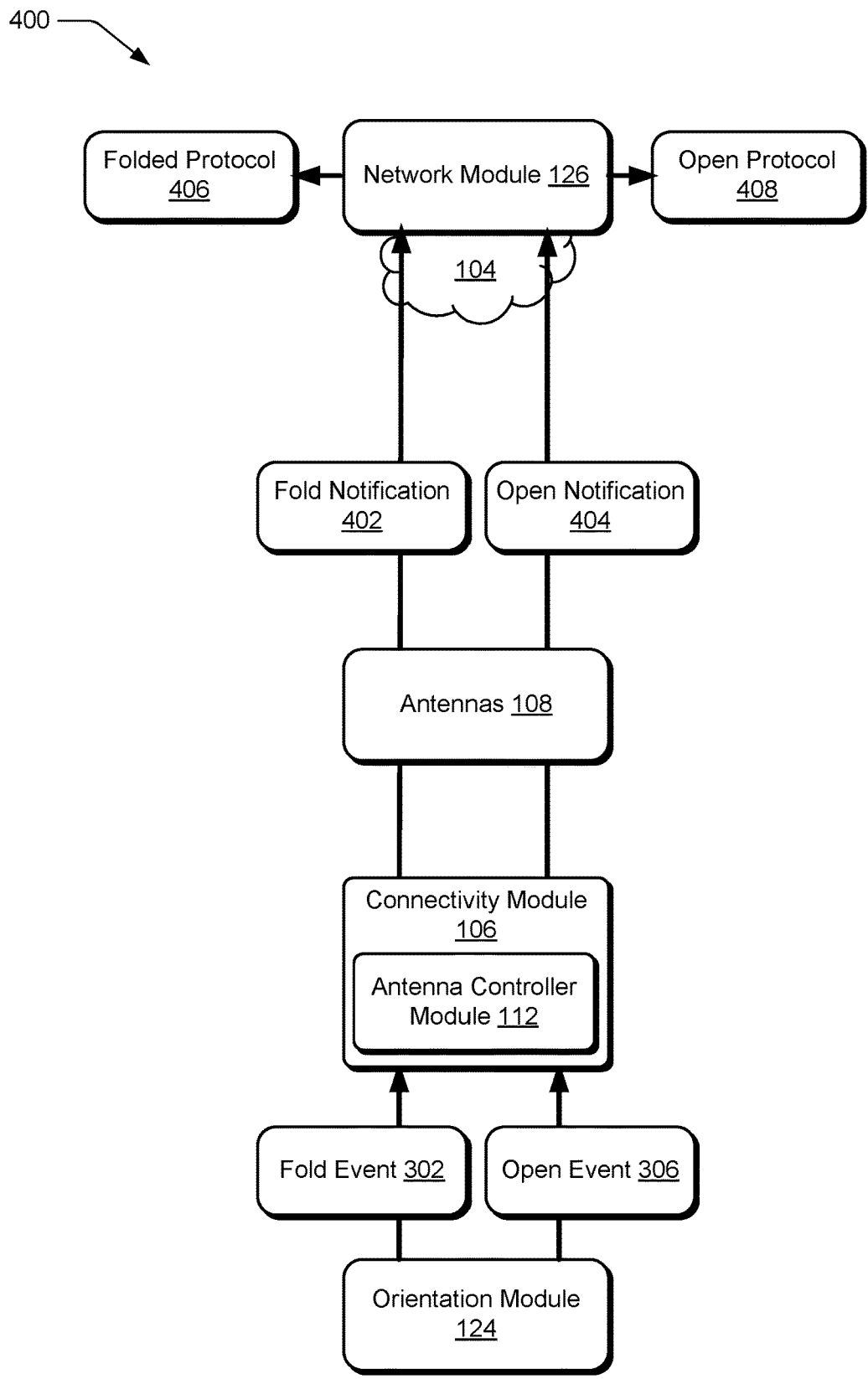
FIG. 4 depicts an example implementation scenario for notifying a network entity regarding a change in physical configuration of a wireless device in accordance with one or more implementations.

FIG. 4 depicts an example implementation scenario 400 for notifying a network entity regarding a change in physical configuration of a wireless device. In at least one implementation, the scenario 400 is implemented in conjunction with the scenario 300. In the scenario 400, the antenna controller module 112 receives the fold event 302 and the open event 306 from the orientation module 124. Generally, the fold event 302 and the open event 306 are received at different times, such as in response to changes in the physical orientation of the wireless device 102. Accordingly, in response to the fold event 302, the antenna controller module 112 generates a fold notification 402 and leverages the connectivity module 106 and the antennas 108 to communicate the fold notification 402 to the network module 126. Further, in response to the open event 306, the antenna controller module 112 generates an open notification 404 and leverages the connectivity module 106 and the antennas 108 to communicate the open notification 404 to the network module 126.

The fold notification 402 and the open notification 404 are able to be implemented in various ways. For instance, the fold notification 402 includes data indicating that the wireless device 102 transitions to and/or is currently in the folded configuration 202. Alternatively or additionally the fold notification 402 includes instructions to the network module 126 to adapt how the network module 126 controls wireless communication to and/or from the wireless device 102 to accommodate the folded configuration 202. As a further example, the open notification 404 includes data indicating that the wireless device 102 transitions to and/or is currently in the open configuration 200. Alternatively or additionally, the open notification 404 includes instructions to the network module 126 to adapt how the network module 126 controls wireless communication to and/or from the wireless device 102 to accommodate the open configuration 200.

Accordingly, in response to the fold notification 402, the network module 126 implements a folded protocol 406 for wireless communication between the network module 126 and the wireless device 102. The folded protocol 406, for instance, specifies how the network module 126 controls wireless communication with the wireless device 102 while the folded protocol 406 is active. Consider, for example, that in the folded configuration 202 wireless performance of the wireless device in certain wireless frequency bands (e.g., 5G frequencies) is known to be degraded, such as based on proximity between the antenna regions 122*a*, 122*b*. Accordingly, the folded protocol 406 is able to adapt to the degraded performance of the wireless device 102, such as by deprioritizing and/or switching off wireless communication in the specified frequency bands. Alternatively or additionally, the folded protocol 406 is implemented in response to an instruction from the fold notification 402 to implement the folded protocol 406.

Further, consider that in response to the open notification 404, the network module 126 implements an open protocol 408 for wireless communication between the network 104 and the wireless device 102. The open protocol 408, for instance, specifies how the network module 126 controls wireless communication with the wireless device 102 while the open protocol 408 is active. For instance, in the open configuration 200 the antennas 108 are typically less free from obstruction than in the folded configuration 202. Thus, the open protocol 408 is able to adapt to increased performance capability of the wireless device 102, such as by making additional wireless frequency bands available for communication to the wireless device 102 than are available based on the folded protocol 406. In at least one implementation, the open protocol 408 is implemented in response to an instruction from the open notification 404 to implement the open protocol 408.

Accordingly, the scenarios 300, 400 are able to be implemented to dynamically configure operation of the wireless device 102 and the network module 126 based on detecting real time changes in physical configuration of the wireless device.

Figure 5:
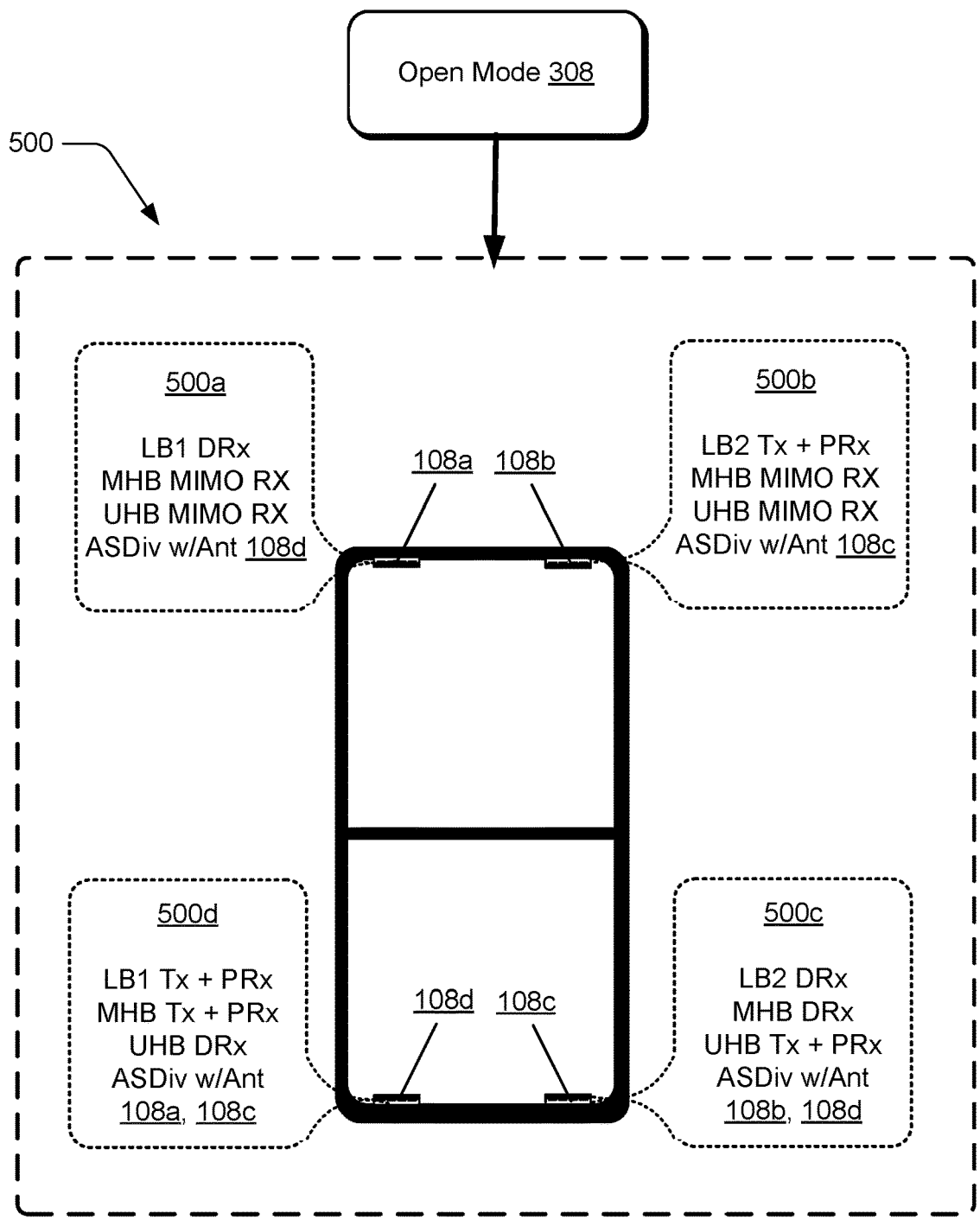
FIG. 5 depicts an example implementation of an open mode for antenna configuration in accordance with one or more implementations.

FIG. 5 depicts an example implementation of the open mode 308 introduced in FIG. 3. The open mode 308, for instance, is depicted with reference to antenna configurations 500 for each of the antennas 108. The antenna configurations 500 include:

Configuration 500a for antenna 108a—In this configuration, the antenna 108a is utilizable for:
  (1) Diversity receive (DRx) for low band frequencies of a first wireless technology, i.e., $LB_1$. The first wireless technology, for instance, is implemented according to the LTE standard.
  (2) Mid-High Band (MHB) multiple-input and multiple-output (MIMO), such as for LTE and 5G.
  (3) Ultra-High Band (UHB) multiple-input and multiple-output (MIMO), such as for LTE and 5G.
  (4) Antenna switch diversity (ASDiv) with antenna 108d.

Configuration 500b for antenna 108b—In this configuration, the antenna 108b is utilizable for:
  (1) Transmit (Tx) and primary receive (PRx) for low band frequencies of a second wireless technology ($LB_2$), e.g., 5G.
  (2) MHB MIMO
  (3) UHB MIMO
  (4) ASDiv with antenna 108c Configuration 500c for antenna 108c—In this configuration, the antenna 108c is utilizable for:
  (1) DRx for low band frequencies of the second wireless technology ($LB_2$), e.g., 5G.
  (2) MHB DRx
  (3) UHB transmit (Tx) and PRx
  (4) ASDiv with antennas 108b, 108d Configuration 500d for antenna 108d—In this configuration, the antenna 108d is utilizable for:
  (1) Transmit (Tx) and primary receive (PRx) for low band frequencies of the first wireless technology ($LB_1$), e.g., LTE.
  (2) MHB Tx and PRx
  (3) UHB DRx
  (4) ASDiv with antenna 108a, 108c Accordingly, the open mode 308 allows for a variety of different antenna path configurations to support multiple different implementation scenarios and device states. Further, notice that the LB primary receive for wireless technologies 1 and 2 are implemented on separate antennas, e.g., antenna 108b for the second wireless technology and antenna 108d for the first wireless technology. Generally, this enables the respective antennas to be independently tuned to avoid adversely affecting signal receive performance of one wireless technology in favor of the other wireless technology.

Figure 6:
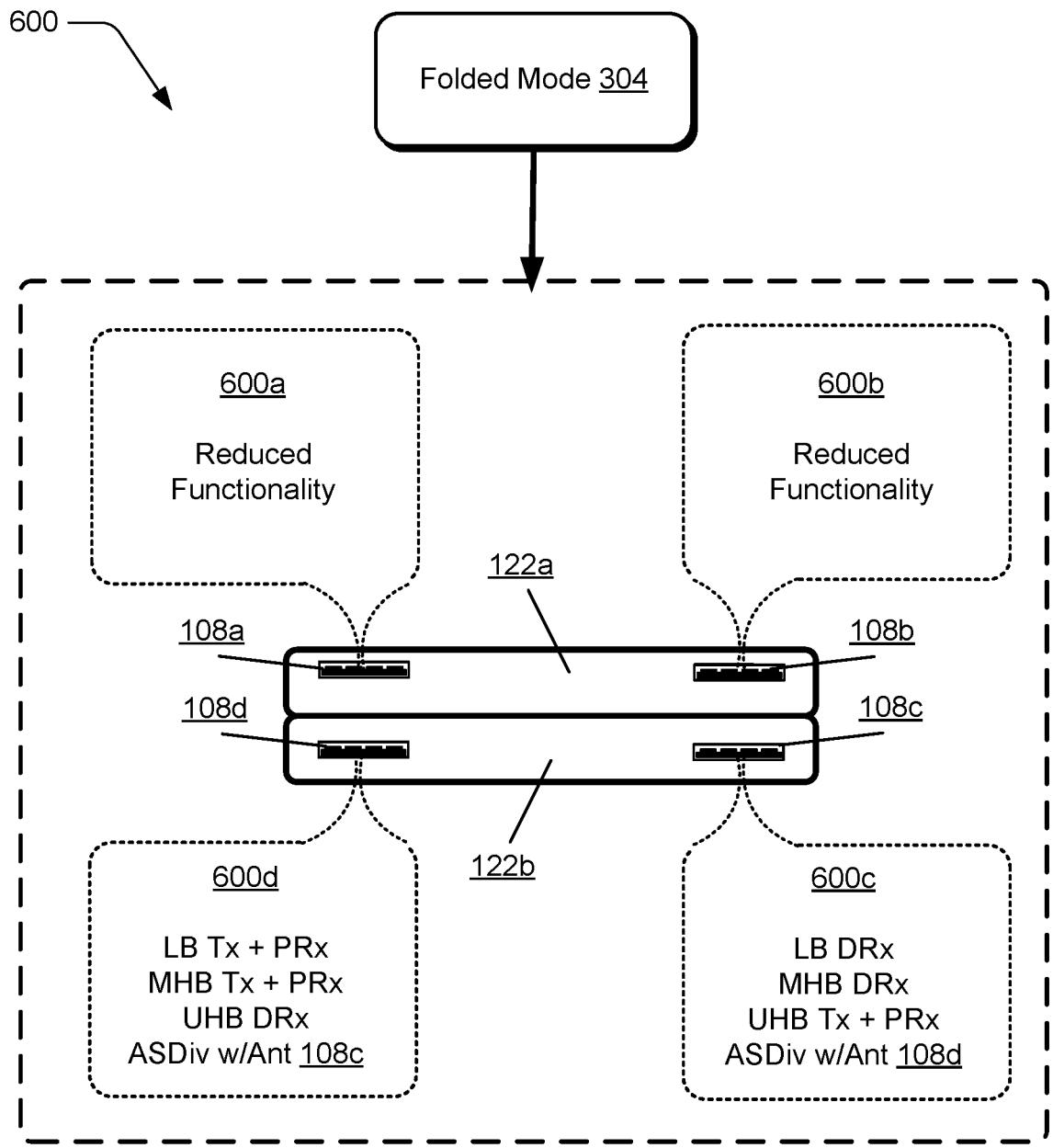
FIG. 6 depicts an example implementation of a folded mode for antenna configuration in accordance with one or more implementations.

FIG. 6 depicts an example implementation of the folded mode 304 introduced in FIG. 3. The view presented in FIG. 6 depicts a facing view of the front edge of the wireless device 102 in the folded configuration 202 including the antenna region 122a with the antennas 108a, 108b and the antenna region 122b with the antennas 108c, 108d. In this example, the folded mode 304 is depicted with reference to antenna configurations 600 for each of the antennas 108. The antenna configurations 600 include:

Configuration 600a for antenna 108a—In this configuration, the antenna 108a is in a reduced operation mode. For instance, the antenna controller module 112 switches the antenna 108a off and/or removes the antenna 108a from an active antenna path of the antennas 108.

Configuration 600b for antenna 108b—In this configuration, the antenna 108b is in a reduced operation mode. For instance, the antenna controller module 112 switches the antenna 108b off and/or removes the antenna 108b from an active antenna path of the antennas 108.

Configuration 600c for antenna 108c—In this configuration, the antenna 108c is usable for:
  (1) LB Tx and PRx for technology 1, e.g., LTE.
  (2) MHB Tx and PRx for technology 1.
  (3) UHB DRx for technology 1
  (4) ASDiv with antenna 108c Configuration 600d for antenna 108d—In this configuration, the antenna 108d is usable for:
  (1) LB Drx for technology 1, e.g., LTE
  (2) MHB DRx for technology 1
  (3) UHB Tx and PRx for technology 1
  (4) ASDiv with antenna 108d Thus, in at least one implementation, wireless functionality of the wireless device 102 is reduced in the folded configuration 202 in comparison with the open configuration 200. For instance, 5G functionality is reduced or disabled, such as by disabling 4×4 MIMO that is available in the open configuration 200. The antenna controller module 112, for example, signals the network module 126 with this reduced capability via the fold notification 402 such as described above with reference to the scenario 400.

Figure 7:
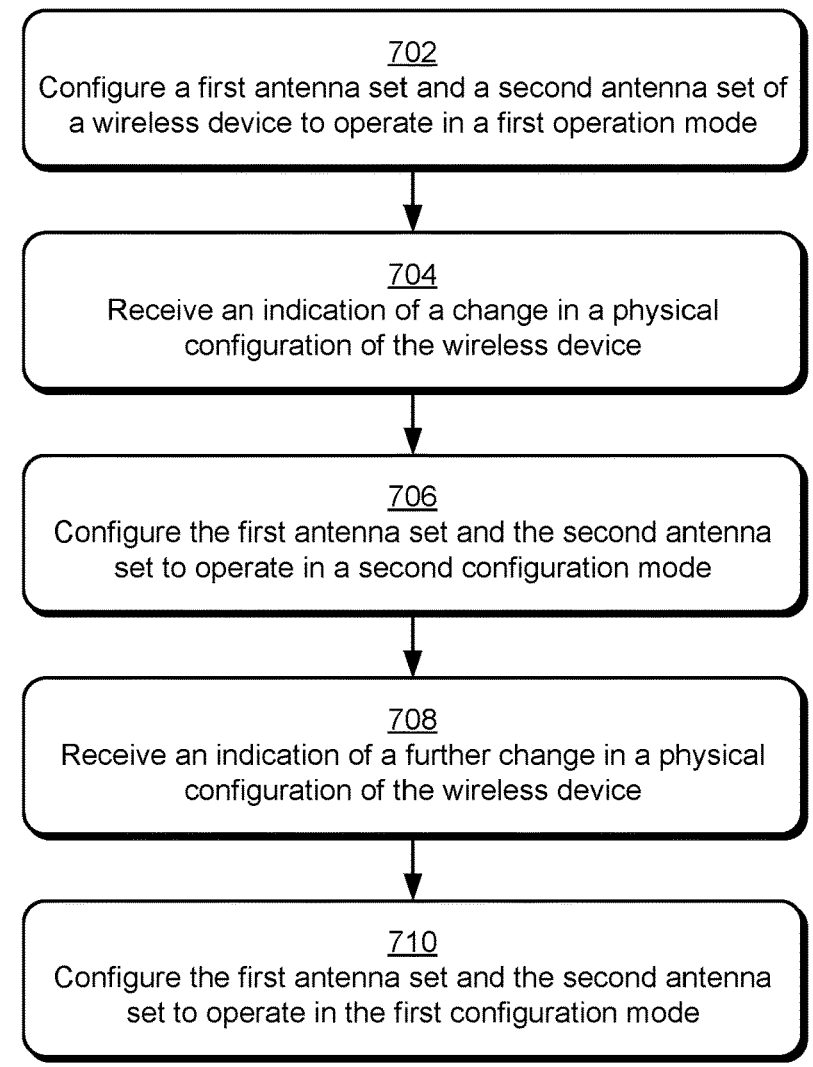
FIG. 7 depicts a method for configuring antenna operation based on a change in physical configuration of a device in accordance with one or more implementations.

FIG. 7 depicts a method 700 for configuring antenna operation based on a change in physical configuration of a device in accordance with one or more implementations. At 702, a first antenna set and a second antenna set of a wireless device are configured to operate in a first operation mode. In at least one implementation, the first antenna set represents the antennas 108a, 108b and the second antenna set represents the antennas 108c, 108d. The antenna controller module 112, for instance, configures the antennas 108 to operate in the open mode 308 while the wireless device 102 is in the open configuration 200.

At 704, an indication is received of a change in a physical configuration of the wireless device. For example, the antenna controller module 112 determines that the wireless device 102 transitions from the open configuration 200 to the folded configuration 202, such as based on a notification from the orientation module 124.

At 706, the first antenna set and the second antenna set are configured to operate in a second configuration mode. The antenna controller module 112, for instance, reconfigures the antennas 108 to operate in the folded mode 304. For example, in the folded mode 304, the operation of the antennas 108a, 108b (e.g., the first antenna set) is reduced, such as by switching the antennas off and/or removing the antennas from an active antenna path of the wireless device 102. Further, the antenna controller module 112 reconfigures functionality of the antennas 108c, 108d, such as by reducing the wireless radio functionality of these antennas. For example, consider the reduction in radio functionality of the antennas 108c, 108d depicted in the transition from the open mode 308 and the folded mode 304 illustrated in FIGS. 5, 6. In the folded mode 304, for instance, the antennas 108c, 108d are the primary antennas of the wireless device 102, but the wireless technologies and/or protocols for which the antennas 108c, 108d are utilized are reduced.

At 708, an indication is received of a further change in a physical configuration of the wireless device. For example, the antenna controller module 112 determines that the wireless device 102 transitions from the folded configuration 202 to the open configuration 200, such as based on a notification from the orientation module 124. At 710, the first antenna set and the second antenna set are configured to operate in the first configuration mode. The antenna controller module 112, for instance, reconfigures the antennas 108 to operate in the open mode 308.

Figure 8:
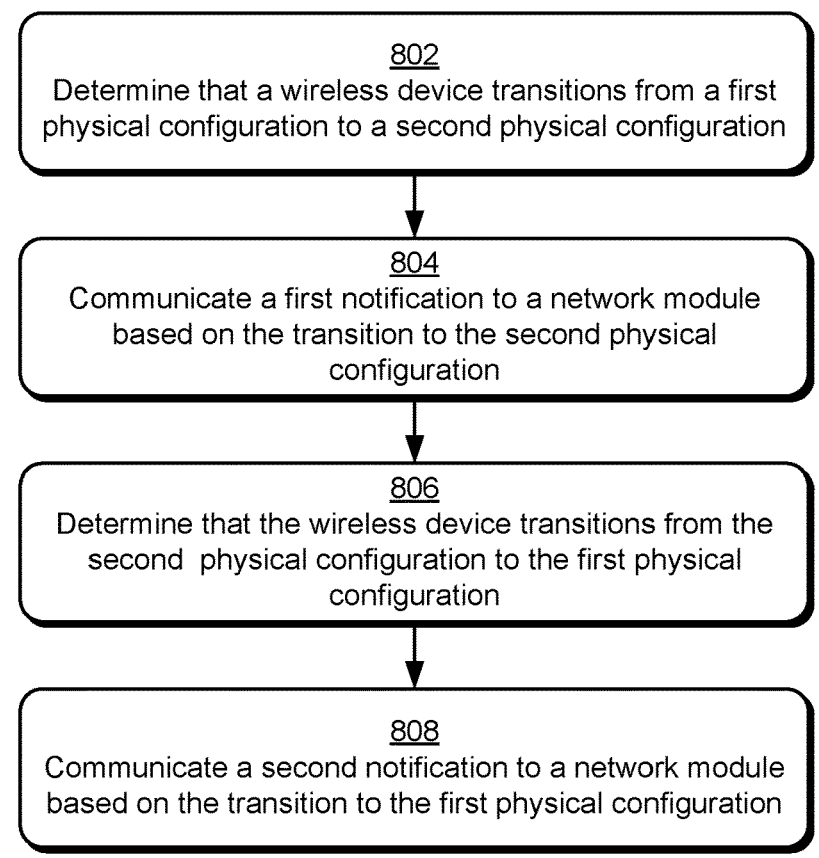
FIG. 8 depicts a method for notifying a network entity based on a change in physical configuration of a device in accordance with one or more implementations.

FIG. 8 depicts a method 800 for notifying a network entity based on a change in physical configuration of a device in accordance with one or more implementations. At 802, it is determined that a wireless device transitions from a first physical configuration to a second physical configuration. The antenna controller module 112, for instance, determines that the wireless device 102 transitions from the open configuration to the folded configuration, such as based on a notification from the orientation module 124.

At 804, a first notification is communicated to a network module based on the transition to the second physical configuration. For instance, the antenna controller module 112 leverages the connectivity module 106 and the antennas 108 to communicate a notification wirelessly to the network module 126 based on the transition to the second physical configuration. Example attributes of this notification are detailed above, such as with reference to the fold notification 402.

At 806, it is determined that the wireless device transitions from the second physical configuration to the first physical configuration. The antenna controller module 112, for instance, determines that the wireless device 102 transitions from the folded configuration to the open configuration, such as based on a notification from the orientation module 124.

At 808, a second notification is communicated to the network module based on the transition to the first physical configuration. For instance, the antenna controller module 112 leverages the connectivity module 106 and the antennas 108 to communicate a notification wirelessly to the network module 126 based on the transition to the first physical configuration. Example attributes of this notification are detailed above, such as with reference to the open notification 404.

Figure 9:
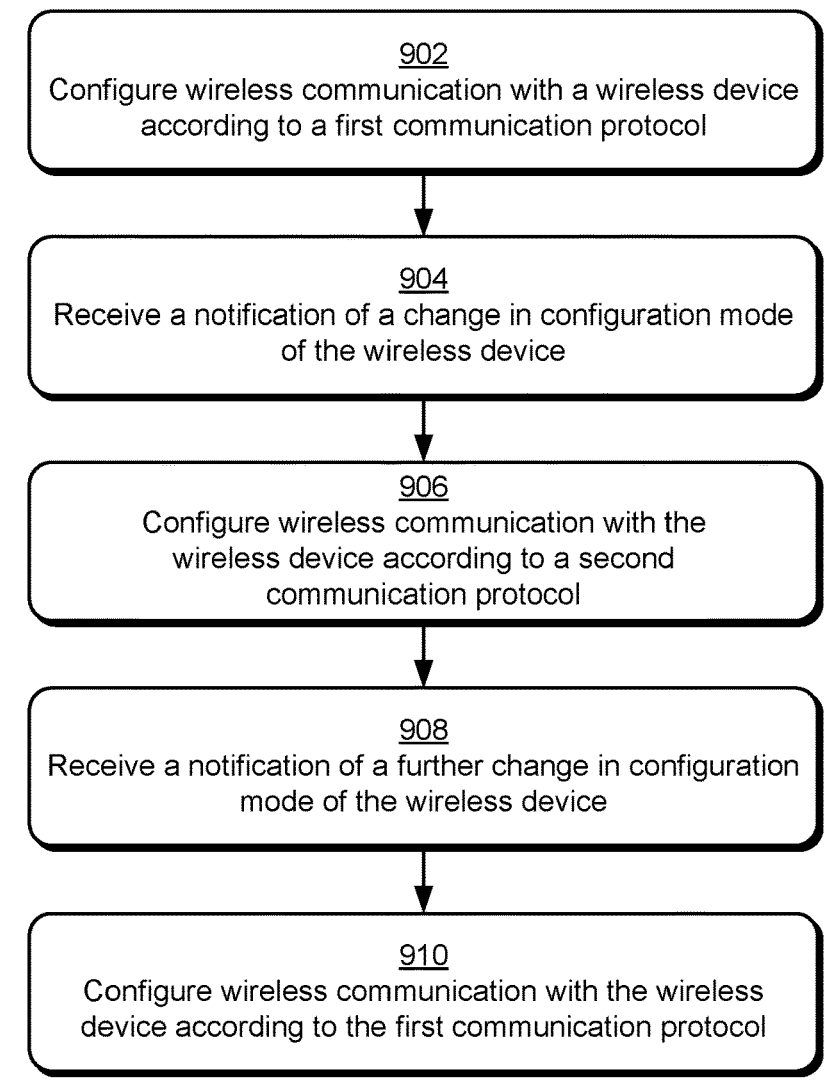
FIG. 9 depicts a method for reconfiguring network communication protocol based on a change in physical configuration of a wireless device in accordance with one or more implementations.

FIG. 9 depicts a method 900 for reconfiguring network communication protocol based on a change in physical configuration of a wireless device in accordance with one or more implementations. In at least one implementation, the method is implemented by a network entity such as the network module 126. At 902, wireless communication with a wireless device is configured according to a first communication protocol. The network module 126, for instance, communicates with the wireless device 102 according to a first protocol that specifies particular wireless technologies and/or wireless protocols that are available for wireless transmission to the wireless device 102. One example of the first communication protocol is discussed above with reference to the open protocol 408.

At 904, a notification is received of a change in configuration mode of the wireless device. The network module 126, for example, receives a notification from the wireless device 102 indicating a change from the open mode 308 to the folded mode 304. Generally, the change in configuration mode is based at least in part on a change in a physical configuration of the wireless device. One example of such a notification is discussed above with reference to the fold notification 402.

At 906 wireless communication with the wireless device is configured according to a second communication protocol. The network module 126, for instance, communicates with the wireless device 102 according to a second protocol that specifies particular wireless technologies and/or wireless protocols that are available for wireless transmission to the wireless device 102. One example of the second communication protocol is discussed above with reference to the folded protocol 406. Generally, the second communication protocol represents reduced wireless functionality for wireless communication between a wireless network and the wireless device 102.

At 908 a notification is received of a further change in configuration mode of the wireless device. The network module 126, for example, receives a notification from the wireless device 102 indicating a change from the folded mode 304 to the open mode 308. One example of such a notification is discussed above with reference to the open notification 404.

At 910 wireless communication with the wireless device is configured according to the first communication protocol. The network module 126, for instance, reconfigures network settings from the folded protocol 406 to the open protocol 408.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 10:
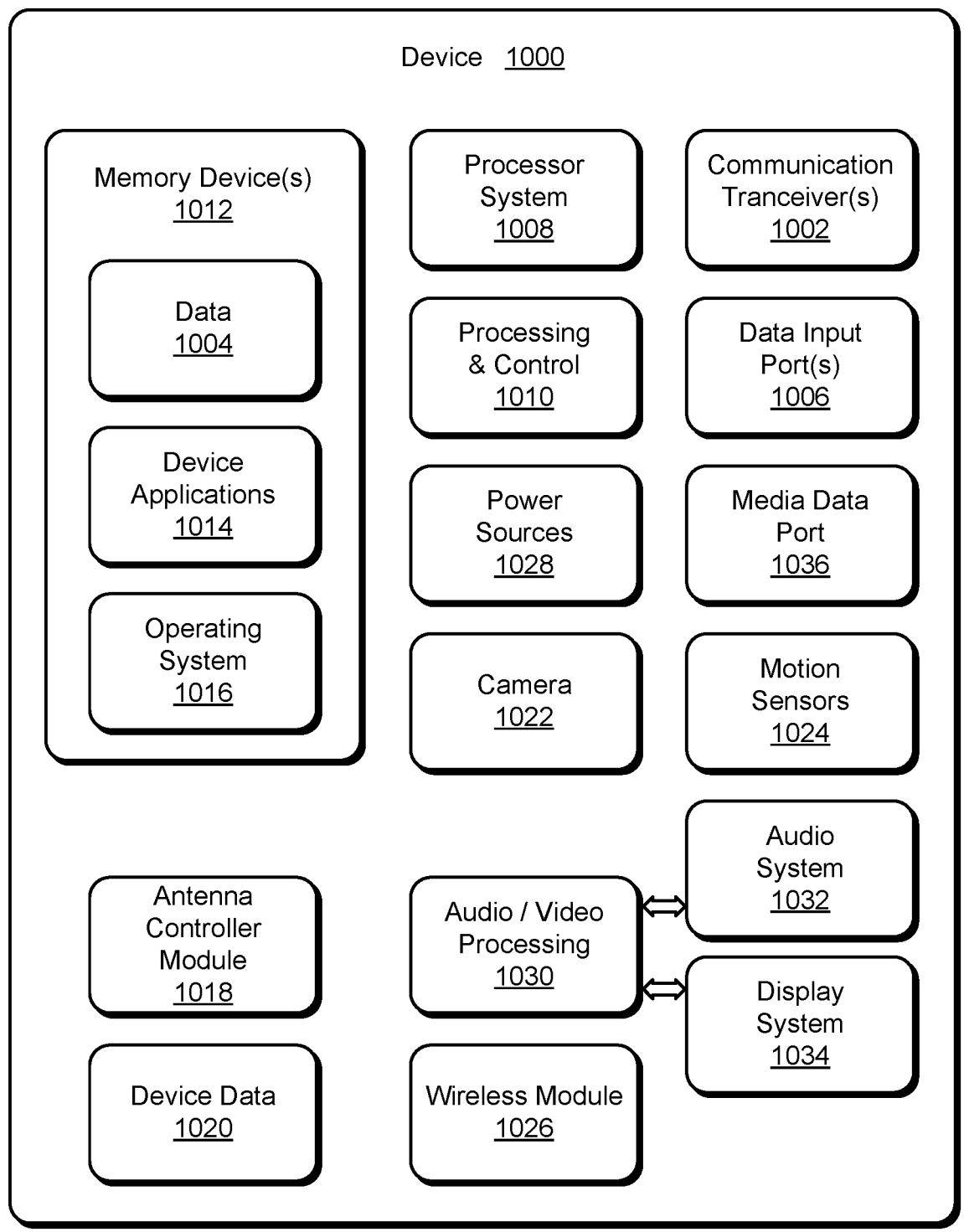
FIG. 10 illustrates various components of an example device that can implement aspects of communication protocol based on physical configuration of a wireless device.

FIG. 10 illustrates various components of an example device 1000 in which aspects of communication protocol based on physical configuration of a wireless device can be implemented. The example device 1000 can be implemented as any of the devices described with reference to the previous FIGS. 1-9, such as any type of wireless device, mobile phone, mobile device, wearable device, tablet, computing, communication, entertainment, gaming, media playback, and/or other type of electronic device. For example, the wireless device 102 as shown and described with reference to FIGS. 1-9 may be implemented as the example device 1000.

The device 1000 includes communication transceivers 1002 that enable wired and/or wireless communication of data 1004 with other devices. The data 1004 can include any of device identifying data, device location data, wireless connectivity data, and wireless protocol data. Additionally, the data 1004 can include any type of audio, video, and/or image data. Example communication transceivers 1002 include wireless personal area network (WPAN) radios compliant with various IEEE 1002.15 (Bluetooth™) standards, wireless local area network (WLAN) radios compliant with any of the various IEEE 1002.11 (Wi-Fi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processor system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. Computer-readable storage memory 1012 represents media and/or devices that enable persistent and/or non-transitory storage of information in contrast to mere signal transmission, carrier waves, or signals per se. Computer-readable storage memory 1012 do not include signals per se or transitory signals.

In this example, the device 1000 includes an antenna controller module 1018 that implements aspects of communication protocol based on physical configuration of a wireless device, and may be implemented with hardware components and/or in software as one of the device applications 1014, such as when the device 1000 is implemented as the wireless device 102. An example, the antenna controller module 1018 can be implemented as the antenna controller module 112 described in detail above. In implementations, the antenna controller module 1018 may include independent processing, memory, and logic components as a computing and/or electronic device integrated with the device 1000. The device 1000 also includes device data 1020 for implementing aspects of communication protocol based on physical configuration of a wireless device and may include data from the connectivity module 106.

In this example, the example device 1000 also includes a camera 1022 and motion sensors 1024, such as may be implemented in an inertial measurement unit (IMU). The motion sensors 1024 can be implemented with various sensors, such as a gyroscope, an accelerometer, and/or other types of motion sensors to sense motion of the device. The various motion sensors 1024 may also be implemented as components of an inertial measurement unit in the device.

The device 1000 also includes a wireless module 1026, which is representative of functionality to perform various wireless communication tasks. For instance, for the wireless device 102, the wireless module 1026 can be leveraged to scan for and detect wireless networks, as well as negotiate wireless connectivity to wireless networks for the wireless device 102. The device 1000 can also include one or more power sources 1028, such as when the device is implemented as a wireless device. The power sources 1028 may include a charging and/or power system, and can be implemented as a flexible strip battery, a rechargeable battery, a charged super-capacitor, and/or any other type of active or passive power source. Generally, utilizing implementations of communication protocol based on physical configuration of a wireless device enables the power sources 1028 to be conserved as part of a wireless network connectivity process.

The device 1000 also includes an audio and/or video processing system 1030 that generates audio data for an audio system 1032 and/or generates display data for a display system 1034. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1036. In implementations, the audio system and/or the display system are integrated components of the example device. Alternatively, the audio system and/or the display system are external, peripheral components to the example device.

Although implementations of communication protocol based on physical configuration of a wireless device have been described in language specific to features and/or methods, the subject of the appended claims is not necessarily limited to the specific features or methods described. Rather, the features and methods are disclosed as example implementations of communication protocol based on physical configuration of a wireless device, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

A wireless device including: a first member foldably attached to a second member to enable the wireless device to assume an open configuration and a folded configuration; a first antenna set positioned within the first member and a second antenna set positioned within the second member; and an antenna controller module implemented to: configure the first antenna set and the second antenna set in a first operation mode in response to the wireless device being positioned in the open configuration; and configure the first antenna set and the second antenna set in a second operation mode in response to the wireless device being positioned in the folded configuration, the second operation mode including to configure the first antenna set with reduced functionality in comparison with the first operation mode.

Alternatively or in addition to the above described device, any one or combination of: wherein in the open configuration the first antenna set and the second antenna set are positioned coplanar with a chassis of the wireless device, and in the folded configuration the first antenna set and the second antenna set are positioned adjacent one another; further including an orientation module implemented to detect a switch between the open configuration and the closed position of the wireless device, and to notify the antenna controller module of the switch; wherein the first operation mode enables operation of the first antenna set and the second antenna set for a first wireless technology and a second wireless technology, and wherein the second operation mode reduces operation of the wireless device for the second wireless technology; wherein the second wireless technology includes a higher wave frequency technology than the first wireless technology; wherein to configure the first antenna set with reduced functionality includes to switch the first antenna set off; wherein to configure the first antenna set with reduced functionality includes to remove the first antenna set from an active antenna path of the wireless device; wherein the antenna controller module is further implemented to: determine that the wireless device transitions from the open configuration to the folded configuration and communicate a first notification to a remote module based on the transition to the folded configuration; and determine that the wireless device transitions from the folded configuration to the open configuration and communicate a second notification to the network module based on the transition to the open configuration; wherein the first notification includes an instruction to stop utilizing a particular wireless technology for wireless transmission to the wireless device, and the second notification includes an instruction to resume utilizing the particular wireless technology for wireless transmission to the wireless device; wherein the first notification identifies the transition from the open configuration to the folded configuration, and the second notification identifies the transition from the folded configuration to the open configuration; wherein in the open configuration the first antenna set includes a first antenna implemented as a primary receive antenna for a first wireless technology, and the second antenna set includes a second antenna implemented as a primary receive antenna for a second wireless technology, wherein the antenna controller module is further implemented to independently tune the first antenna for the first wireless technology and the second antenna for the second wireless technology.

A method including: configuring a first antenna set and a second antenna set of a wireless device in a first operation mode; receiving an indication of a change in a physical configuration of the wireless device; and configuring, based on the change in physical configuration, the first antenna set and the second antenna set in a second configuration mode, the second configuration mode including configuring the first antenna set with reduced functionality in comparison with the first operation mode.

Alternatively or in addition to the above described method, any one or combination of: wherein said receiving the indication of the change in the physical configuration of the wireless device includes receiving an indication that the wireless device transitions from an open configuration to a folded configuration; wherein said configuring the first antenna set with reduced functionality includes switching the first antenna set off; wherein said configuring the first antenna set and the second antenna set in the second configuration mode further includes reconfiguring an antenna switch diversity setting of the second antenna set to exclude the first antenna set; further including: determining that the wireless device transitions from the open configuration to the folded configuration; communicating a first notification to a remote network module based on the transition to the folded configuration; determining that the wireless device transitions from the folded configuration to the open configuration; and communicating a second notification to the remote network module based on the transition to the open configuration.

A method including: configuring, by a network module of a wireless network, wireless communication with a wireless device according to a first communication protocol; receiving a notification of a change in configuration mode of the wireless device, the change in configuration mode based at least in part on a change in a physical configuration of the wireless device; and configuring, by the network module, wireless communication with the wireless device according to a second communication protocol, the second communication protocol including reduced wireless functionality for wireless communication between the wireless network and the wireless device.

Alternatively or in addition to the above described method, any one or combination of: wherein the notification of the change in configuration mode includes an instruction to reduce the wireless functionality for wireless communication between the wireless network and the wireless device; wherein the change in physical configuration of the wireless device includes a transition from an open configuration to a folded configuration, and the notification of the change in configuration mode identifies the change in physical configuration of the wireless device; wherein said configuring wireless communication with the wireless device according to the second communication protocol includes one or more of reducing or stopping wireless transmission to the wireless device according to a particular wireless technology.

The invention claimed is:

1. A network device comprising:
one or more processors; and
one or more computer-readable storage media storing instructions that are executable by the one or more processors to:
configure wireless communication with a wireless device according to a first communication protocol;
receive a notification of a change in configuration mode of the wireless device, the change in configuration mode based at least in part on a change in a physical configuration of the wireless device; and
configure wireless communication with the wireless device according to a second communication protocol, the second communication protocol including reduced wireless functionality relative to the first communication protocol for wireless communication between a wireless network and the wireless device.

2. The network device of claim 1, wherein the notification of the change in configuration mode includes an instruction to reduce the wireless functionality for wireless communication between the wireless network and the wireless device.

3. The network device of claim 1, wherein the change in physical configuration of the wireless device comprises a transition from an open configuration to a folded configuration, and the notification of the change in configuration mode identifies the change in physical configuration of the wireless device.

4. The network device of claim 1, wherein to configure wireless communication with the wireless device according to the second communication protocol comprises one or more of to reduce or to stop wireless transmission to the wireless device according to a particular wireless technology.

5. The network device of claim 1, wherein to configure wireless communication with the wireless device according to the second communication protocol comprises one or more of to reduce or to stop wireless transmission to the wireless device in one or more wireless frequency bands.

6. The network device of claim 1, wherein to configure wireless communication with the wireless device according to the second communication protocol comprises to deprioritize wireless transmission to the wireless device in one or more wireless frequency bands.

7. The network device of claim 1, wherein the instructions are executable by the one or more processors to:
receive a notification of a further change in configuration mode of the wireless device, the further change in configuration mode based at least in part on a further change in the physical configuration of the wireless device; and
configure, based at least in part on the further change in configuration mode, wireless communication with the wireless device according to the first communication protocol, the first communication protocol including increased wireless functionality relative to the second communication protocol for wireless communication between the wireless network and the wireless device.

8. The network device of claim 7, wherein the further change in physical configuration of the wireless device comprises a transition from a folded configuration to an open configuration, and the notification of the change in configuration mode identifies the further change in physical configuration of the wireless device.

9. The network device of claim 7, wherein to configure wireless communication with the wireless device according to the first communication protocol comprises one or more of to:
increase wireless transmission to the wireless device according to a particular wireless technology; or
increase wireless transmission to the wireless device in one or more wireless frequency bands.

10. The network device of claim 1, wherein the network device comprises a base station of the wireless network.

11. A system comprising:
one or more processors; and
a network module executable by the one or more processors to:
configure wireless communication with a wireless device according to a first communication protocol;
receive a notification of a change in configuration mode of the wireless device, the change in configuration mode based at least in part on a change in a physical configuration of the wireless device; and
configure wireless communication with the wireless device according to a second communication protocol, the second communication protocol including reduced wireless functionality relative to the first communication protocol for wireless communication between a wireless network and the wireless device.

12. The system of claim 11, wherein the notification of the change in configuration mode includes an instruction to reduce the wireless functionality for wireless communication between the wireless network and the wireless device.

13. The system of claim 11, wherein the change in physical configuration of the wireless device comprises a transition from an open configuration to a folded configuration, and the notification of the change in configuration mode identifies the change in physical configuration of the wireless device.

14. The system of claim 11, wherein to configure wireless communication with the wireless device according to the second communication protocol comprises one or more of to reduce or to stop wireless transmission to the wireless device according to a particular wireless technology.

15. The system of claim 11, wherein to configure wireless communication with the wireless device according to the second communication protocol comprises one or more of to reduce or to stop wireless transmission to the wireless device in one or more wireless frequency bands.

16. The system of claim 11, wherein to configure wireless communication with the wireless device according to the second communication protocol comprises to deprioritize wireless transmission to the wireless device in one or more wireless frequency bands.

17. A method comprising:
configuring, by a network module of a wireless network, wireless communication with a wireless device according to a first communication protocol;
receiving a notification of a change in configuration mode of the wireless device, the change in configuration mode based at least in part on a change in a physical configuration of the wireless device; and
configuring, by the network module, wireless communication with the wireless device according to a second communication protocol, the second communication protocol including reduced wireless functionality for wireless communication between the wireless network and the wireless device.

18. The method of claim 17, wherein the notification of the change in configuration mode includes an instruction to reduce the wireless functionality for wireless communication between the wireless network and the wireless device.

19. The method of claim 17, wherein the change in physical configuration of the wireless device comprises a transition from an open configuration to a folded configuration, and the notification of the change in configuration mode identifies the change in physical configuration of the wireless device.

20. The method of claim 17, wherein said configuring wireless communication with the wireless device according to the second communication protocol comprises one or more of reducing or stopping wireless transmission to the wireless device according to a particular wireless technology.

* * * * *